(12) United States Patent
Morita et al.

(10) Patent No.: US 9,900,536 B2
(45) Date of Patent: Feb. 20, 2018

(54) IMAGE PICKUP SYSTEM

(71) Applicant: CANON KABUSHIKI KAISHA, Tokyo (JP)

(72) Inventors: Hiroyuki Morita, Ebina (JP); Hiroo Akabori, Fujisawa (JP); Koichiro Iwata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/058,614

(22) Filed: Mar. 2, 2016

(65) Prior Publication Data

US 2016/0261813 A1    Sep. 8, 2016

(30) Foreign Application Priority Data

Mar. 5, 2015   (JP) ................. 2015-043889

(51) Int. Cl.
*H04N 5/378*   (2011.01)
*H04N 5/353*   (2011.01)
*H04N 5/369*   (2011.01)
*H04N 5/3745*   (2011.01)

(52) U.S. Cl.
CPC .......... *H04N 5/378* (2013.01); *H04N 5/3532* (2013.01); *H04N 5/3696* (2013.01); *H04N 5/3745* (2013.01)

(58) Field of Classification Search
CPC .... H04N 5/378; H04N 5/37457; H04N 5/341; H04N 5/3452; H04N 5/374; H04N 5/3741; H04N 5/3742; H04N 5/3743; H04N 5/3745; H04N 3/1506
See application file for complete search history.

(56) References Cited

U.S. PATENT DOCUMENTS

| 2005/0248674 A1* | 11/2005 | Mabuchi | H04N 5/3658 348/308 |
| 2013/0021499 A1* | 1/2013 | Ui | G03B 13/36 348/238 |
| 2013/0113966 A1* | 5/2013 | Arishima | H04N 5/378 348/301 |
| 2013/0194471 A1* | 8/2013 | Yamashita | H04N 5/374 348/308 |

(Continued)

FOREIGN PATENT DOCUMENTS

JP    2010-074243 A    4/2010

*Primary Examiner* — Kelly L Jerabek

(74) *Attorney, Agent, or Firm* — Canon USA, Inc., IP Division

(57) ABSTRACT

In an image pickup system according to an aspect of the present invention, a pixel portion includes a plurality of first pixel rows controlled by a scanning circuit such that charge accumulation periods are at least partially overlapped with each other and a plurality of second pixel rows controlled by the scanning circuit such that charge accumulation periods are not overlapped with the charge accumulation periods of the first pixel rows, part of the plurality of first pixel rows commonly uses a floating diffusion with a pixel in the second pixel row, another part of the plurality of first pixel rows does not commonly use the floating diffusion with the pixel in the second pixel row, and the signal processing unit performs signal processing without using a signal of the pixel in the first pixel row that commonly uses the floating diffusion with the pixel in the second row.

10 Claims, 12 Drawing Sheets

(56) References Cited

U.S. PATENT DOCUMENTS

2014/0263964 A1\* 9/2014 Yang ................ H04N 5/347
  250/208.1
2016/0173799 A1\* 6/2016 Akabori ............ H04N 5/378
  348/322

\* cited by examiner

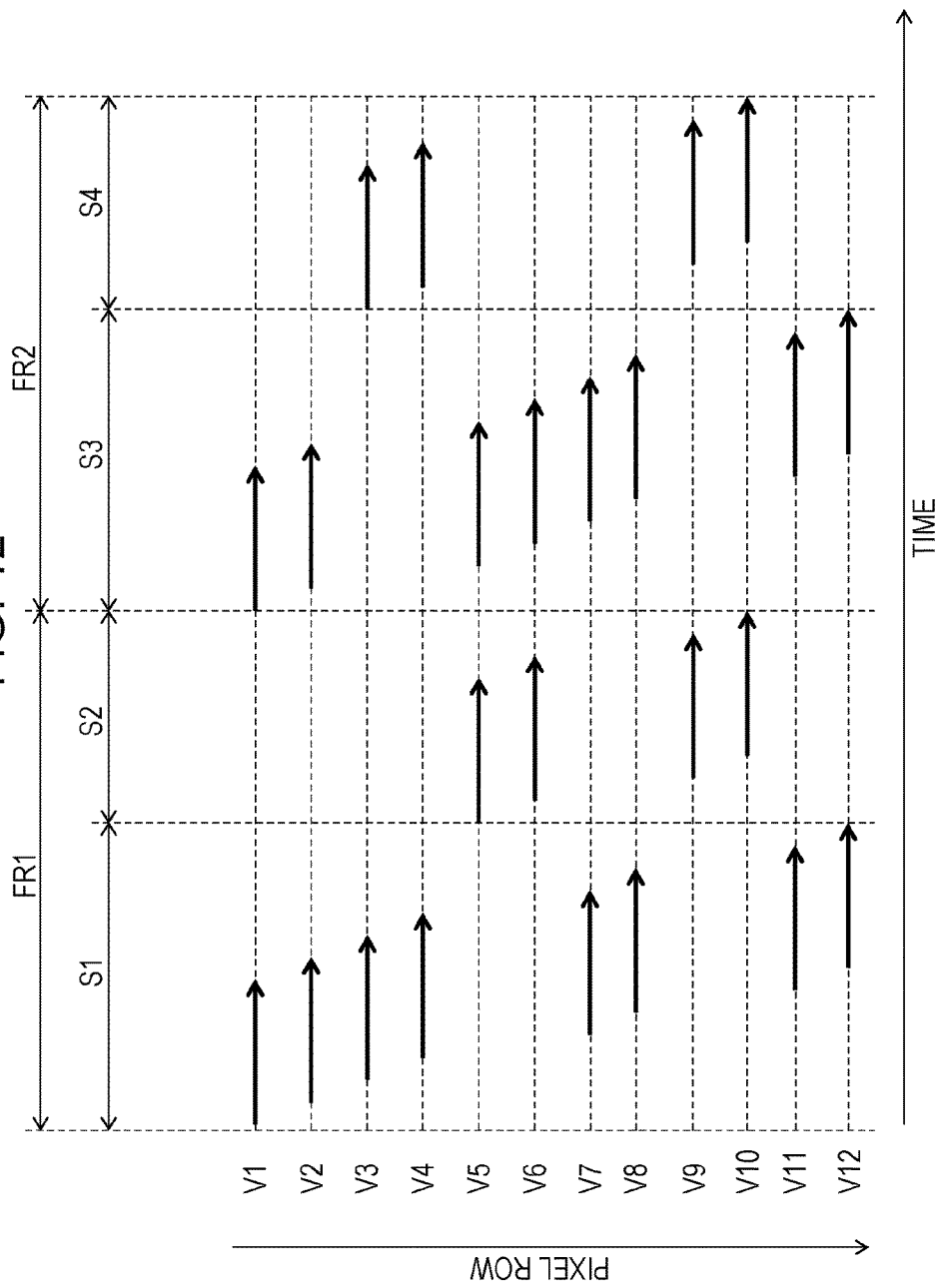

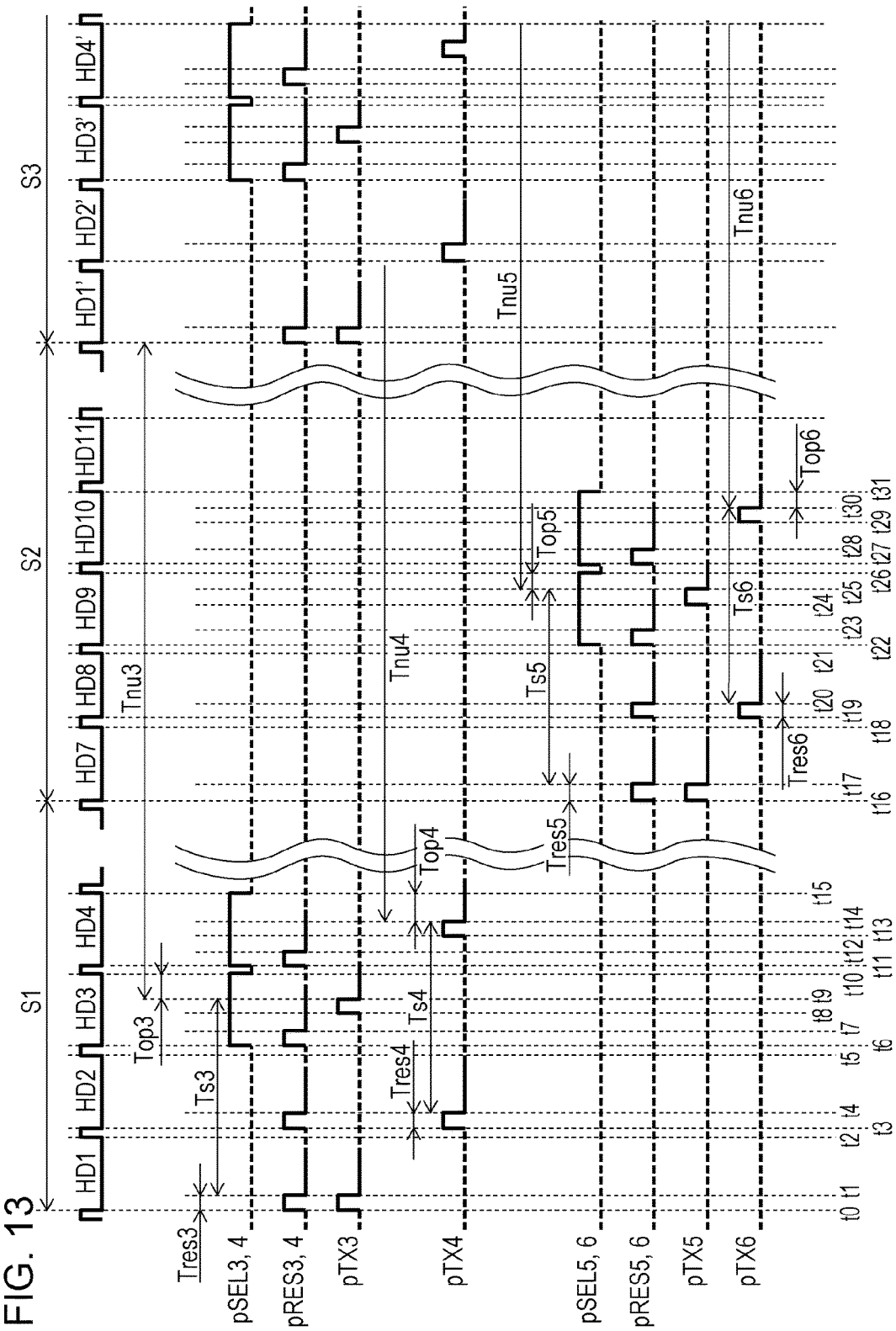

IMAGE PICKUP SYSTEM

BACKGROUND OF THE INVENTION

Field of the Invention

The present invention relates to an image pickup apparatus including a plurality of pixels that commonly use a floating diffusion.

Description of the Related Art

An image pickup apparatus has been proposed in which image pickup pixel rows and function pixel rows used for a function other than image pickup are provided on an imaging plane to read out respective signals.

As an example related to the above-described apparatus, Japanese Patent Laid-Open No. 2010-074243 discloses a method of collectively performing scanning of the image pickup pixel rows when scanning of one frame is performed and thereafter collectively performing scanning of focus detection pixel rows.

SUMMARY OF THE INVENTION

According to an aspect of the present invention, there is provided an image pickup system including: an image pickup apparatus that includes a pixel portion where pixels that each includes a photoelectric conversion unit, a floating diffusion, and a transfer transistor configured to transfer charges generated in the photoelectric conversion unit to the floating diffusion are arranged in a matrix and a scanning circuit configured to control charge accumulation periods of the respective pixels by an electronic shutter operation and output signals generated during the charge accumulation periods from the pixels; and a signal processing unit configured to process a signal output from the image pickup apparatus, the pixel portion including a plurality of first pixel rows controlled by the scanning circuit such that the charge accumulation periods are at least partially overlapped with each other and a plurality of second pixel rows controlled by the scanning circuit such that the charge accumulation periods are not overlapped with the charge accumulation periods of the plurality of first pixel rows, in which part of the plurality of first pixel rows commonly uses the floating diffusion with the pixel in the second pixel row, another part of the plurality of first pixel rows does not commonly use the floating diffusion with the pixel in the second pixel row, and the signal processing unit performs signal processing without using a signal of the pixel in the first pixel row that commonly uses the floating diffusion with the pixel in the second row.

Further features of the present invention will become apparent from the following description of exemplary embodiments with reference to the attached drawings.

BRIEF DESCRIPTION OF THE DRAWINGS

FIG. 12 is a readout sequence diagram.
FIG. 13 is a drive timing chart.

DESCRIPTION OF THE EMBODIMENTS

Figure 1:
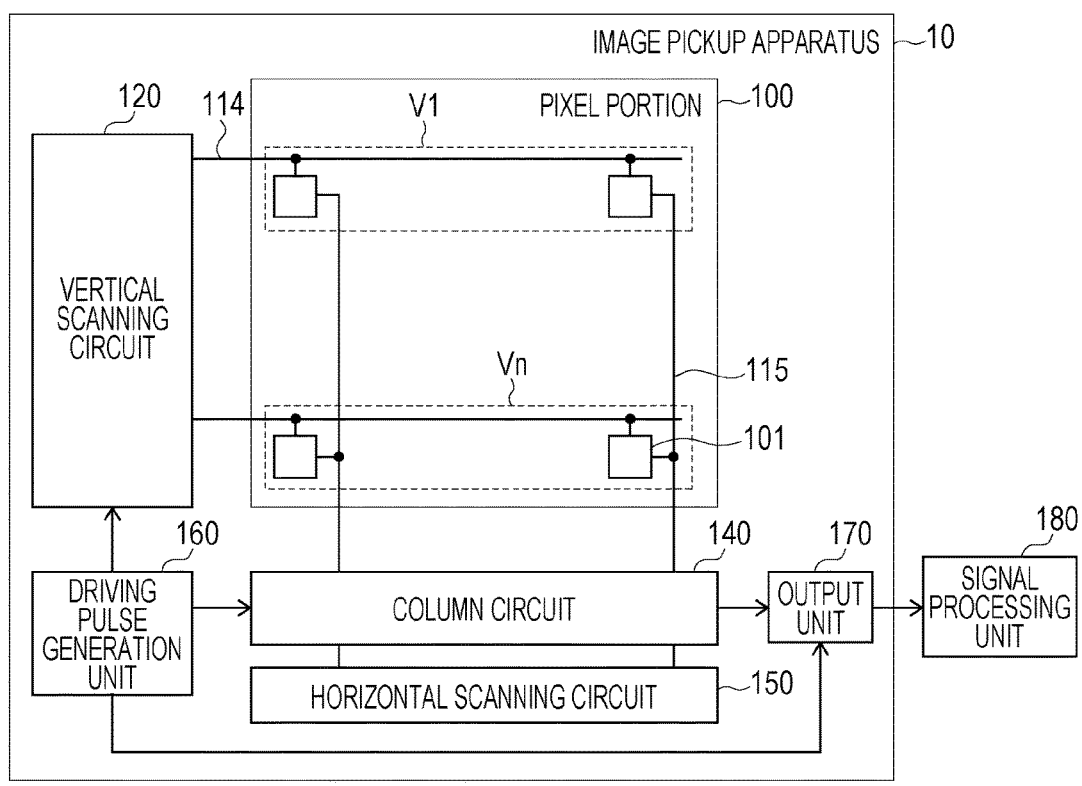
FIG. 1 is a block diagram of an image pickup apparatus.

Hereinafter, an image pickup system according to exemplary embodiments of the present invention will be described with reference to the drawings. Same reference symbols are assigned to elements having similar functions in the drawings, and redundant descriptions will be omitted.

First Exemplary Embodiment

With reference to FIGS. 1 to 5, an image pickup system according to the present exemplary embodiment will be described. In the respective drawings, same reference symbols are assigned to elements having similar functions, and detailed descriptions thereof will be omitted. A configuration of the image pickup system described with reference to FIGS. 1 and 2 can also be applied to other exemplary embodiments.

FIG. 1 is a block diagram of the image pickup system according to the present exemplary embodiment. An image pickup apparatus 10 includes a pixel portion 100, a driving pulse generation unit 160, a vertical scanning circuit 120, a driving line 114, a signal line 115, a column circuit 140, a horizontal scanning circuit 150, and an output unit 170.

A signal processing unit 180 performs processing on a signal output from the image pickup apparatus 10. The signal processing unit 180 performs image formation by using the signal output from the image pickup apparatus 10 and signal generation for performing a function other than image pickup, such as focus detection, by using the signal output from the image pickup apparatus 10. The image pickup apparatus 10 and the signal processing unit 180 may be constituted by the same semiconductor chip or may be constituted by different semiconductor chips.

The pixel portion 100 has a plurality of pixels 101 configured to convert light into a charge signal and output the converted electric signal. The plurality of pixels 101 are arranged in a matrix (in rows and columns).

The driving pulse generation unit 160 generates control pulses, and the vertical scanning circuit 120 receives the control pulses from the driving pulse generation unit 160 and supplies driving pulses to respective pixel rows V1 to Vn via the driving line 114. The driving pulses supplied at this time include pTX for driving a transfer transistor that will be described below, pRES for driving a reset transistor, and pSEL for driving a selection transistor. The column circuit 140 includes, for example, an analog-to-digital (AD) convertor that converts a pixel signal corresponding to an analog signal output from a unit pixel into a digital signal.

An operation of switching ON and OFF of the transistors of the respective pixels while the driving pulses are supplied from the vertical scanning circuit 120 to the transistors of the respective pixels is referred to as a pixel row scanning. When the pixel row is scanned, output of the signals from the respective pixels and start and end of a charge accumulation period are controlled. In the following explanations, the vertical scanning circuit 120 will be simply described as a scanning circuit.

Subsequently, the horizontal scanning circuit 150 outputs signals processed in parallel in the column circuit 140 to the output unit 170 for each column. The signal output from the output unit 170 is input to the signal processing unit 180.

The signal processing unit 180 performs digital signal processing such as defective pixel correction, auto exposure (AE), auto focus (AF), white balance adjustment, gamma adjustment, noise reduction processing, and coincidence processing. Thereafter, the formed image signals are output to a display unit via a storage unit which are not illustrated in the drawing to display an image. As an alternative configuration, signals used for a function other than the image pickup, such as focus detection, are formed.

Figure 2:
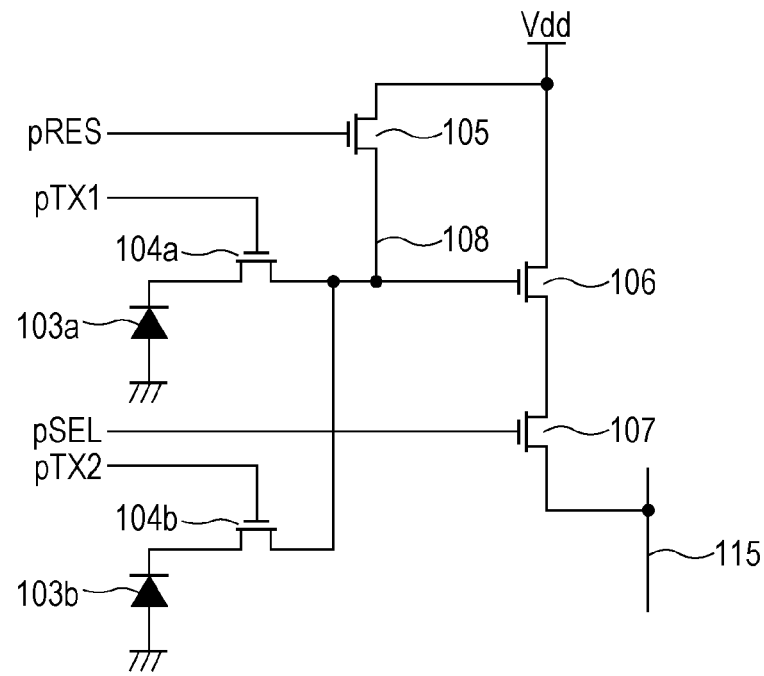
FIG. 2 is a circuit diagram of a pixel.

FIG. 2 illustrates an example pixel equivalent circuit. According to the present exemplary embodiment, descriptions will be given while electrons are used as signal charges, and the respective transistors are constituted by N-type transistors. It should be noted however that holes may be used as the signal charges, and P-type transistors may be used as the transistors of the pixels. FIG. 2 illustrates two pixels that commonly use an FD. Suffixes a and b are used to discriminate the respective pixels, but parts having similar functions will be described without using the suffixes. In a case where the pixels are to be distinguished from each other in descriptions, the descriptions will be given while using the suffixes.

A photoelectric conversion unit 103 generates charge pairs in accordance with incident light and accumulates electrons. A photodiode is used as the photoelectric conversion unit 103, for example.

A transfer transistor 104a transfers electrons accumulated in the photoelectric conversion unit 103a to a floating diffusion (FD) 108, and a transfer transistor 104b transfers electrons accumulated in the photoelectric conversion unit 103b to the FD 108. The control pulses pTX1 and pTX2 are respectively supplied to gates of the transfer transistors 104a and 104b to switch ON and OFF. The FD 108 holds the electrons generated in the photoelectric conversion units 103a and 103b and transferred by the transfer transistors 104a and 104b.

A gate of an amplification transistor 106 is connected to the FD 108, and signals based on the electrons transferred to the FD 108 are amplified and output by the transfer transistors 104a and 104b. More specifically, the electrons transferred to the FD 108 are converted into a voltage in accordance with the amount of electrons, and an electric signal in accordance with the voltage is output to the signal line 115 via the amplification transistor 106. The amplification transistor 106 constitutes a source follower circuit together with a current source that is not illustrated in the drawing.

A reset transistor 105 resets a potential of an input node of the amplification transistor 106. In addition, potentials of the photoelectric conversion units 103a and 103b are reset by overlapping ON periods of the reset transistor 105 and the respective transfer transistors 104a and 104b with each other. The driving pulse pRES is supplied to a gate of the reset transistor 105 to switch ON and OFF. It should be noted however that the configuration is adopted herein in which intermediation of the transfer transistors 104a and 104b is used to reset the photoelectric conversion units 103a and 103b, but a configuration may also be adopted in which the photoelectric conversion units 103a and 103b are directly reset.

A selection transistor 107 outputs signals of a plurality of pixels provided with respect to the single signal line 115 for one pixel each or plural pixels each. A drain of the selection transistor 107 is connected to a source of the amplification transistor 106, and a source of the selection transistor 107 is connected to the signal line 115.

As an alternative to the configuration of the present exemplary embodiment, the selection transistor 107 may be provided between a drain of the amplification transistor 106 and a power source line where a power source voltage is supplied. In either case, the selection transistor 107 controls an electrical connection between the amplification transistor 106 and the signal line 115. The driving pulse pSEL is supplied to a gate of the selection transistor 107 to switch ON and OFF of the selection transistor 107.

It should be noted that the source of the amplification transistor 106 may be connected to the signal line 115 without the provision of the selection transistor 107. In that case, ON and OFF may be switched by switching the potential of the drain of the amplification transistor 106 or the gate of the amplification transistor 106.

Next, an arrangement of a plurality of pixel rows V1 to Vn in the pixel portion 100 will be described with reference to FIG. 3.

A plurality of first pixel rows where control is performed such that the charge accumulation periods are at least partially overlapped with each other by the scanning circuit and a plurality of second pixel rows where control is performed such that the charge accumulation periods are not overlapped with the charge accumulation periods of the plurality of first pixel rows are arranged in the pixel portion 100. In addition, control is performed such that the charge accumulation periods of the plurality of mutual second pixel rows are at least partially overlapped with each other. In FIG. 3, the pixel rows V1 to V3, V5 to V7, and V9 to V11 correspond to first pixel rows 201, and the pixel rows V4, V8, and V12 correspond to second pixel rows 202.

The plurality of first pixel rows can be used, for example, as pixel rows for outputting image pickup signals (hereinafter, will be referred to as image pickup pixel rows). The plurality of second pixel rows can be used, for example, as pixel rows for obtaining function signals having a function other than the image pickup, such as focus detection (hereinafter, will be referred to as function pixel rows). In the following explanation, an example will be described in which the first pixel rows are used as the image pickup pixel rows, and the second pixel rows are used as the function pixel rows.

Figure 3:
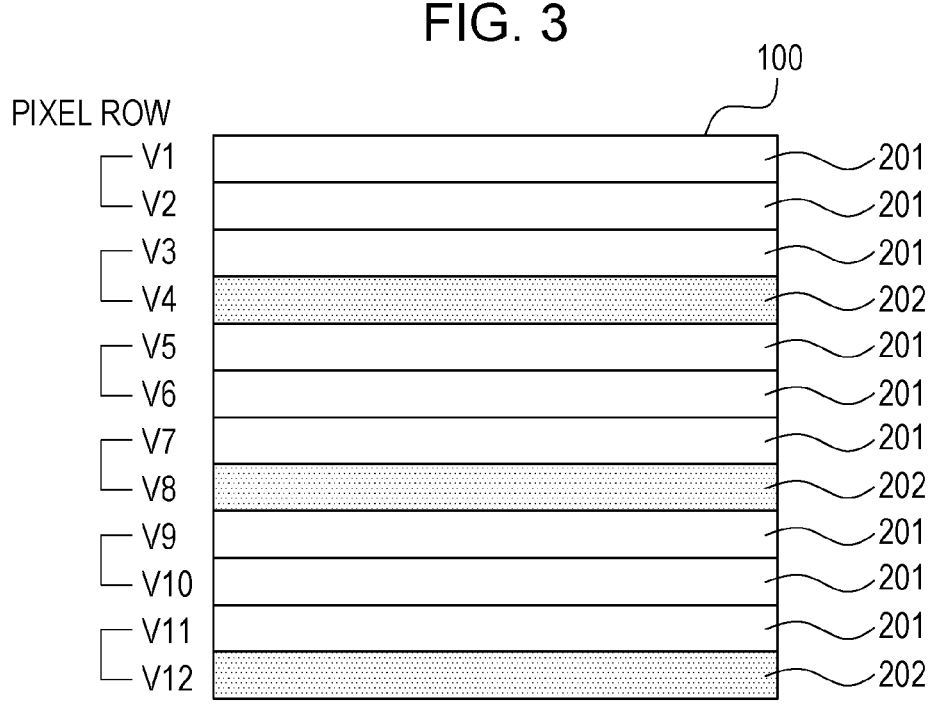
FIG. 3 is an explanatory diagram for illustrating a pixel portion.

In FIG. 3, a pixel in the pixel row V1 and a pixel in the pixel row V2 commonly use the FD 108, and a pixel in the pixel row V3 and a pixel in the pixel row V4 commonly use the FD 108. In the subsequent pixel rows too, in a similar order, two pixels commonly use the FD 108.

Therefore, part (pixel row V3) of the plurality of image pickup pixel rows and a pixel in the function pixel row (V4) commonly use the FD. Subsequently, another part (V1) of the plurality of first pixel rows and the pixel in the function pixel row do not commonly use the FD. As an example in which the pixel in the function pixel row does not commonly use the FD, an example in which the mutual image pickup pixel rows commonly use the FD is illustrated herein. In addition to the above, a case where the FD is not commonly used or a configuration in which the FD is commonly used with a pixel in the other pixel row may be adopted.

For the following explanation, the FD 108 commonly used by the pixel in the image pickup pixel row and the pixel in the function pixel row is set as an FD 108a (first FD). The FD 108 commonly used by only the pixels in the plurality of image pickup pixel rows is set as an FD 108b (second FD). The FD 108 commonly used by only the pixels in the plurality of function pixel rows is set as an FD 108c (third FD). It should be noted that the configuration in which the two pixels commonly use the FD 108 is illustrated herein, but the FD may be commonly used by two or more pixels. The same also applies to the following exemplary embodiments.

Figure 4:
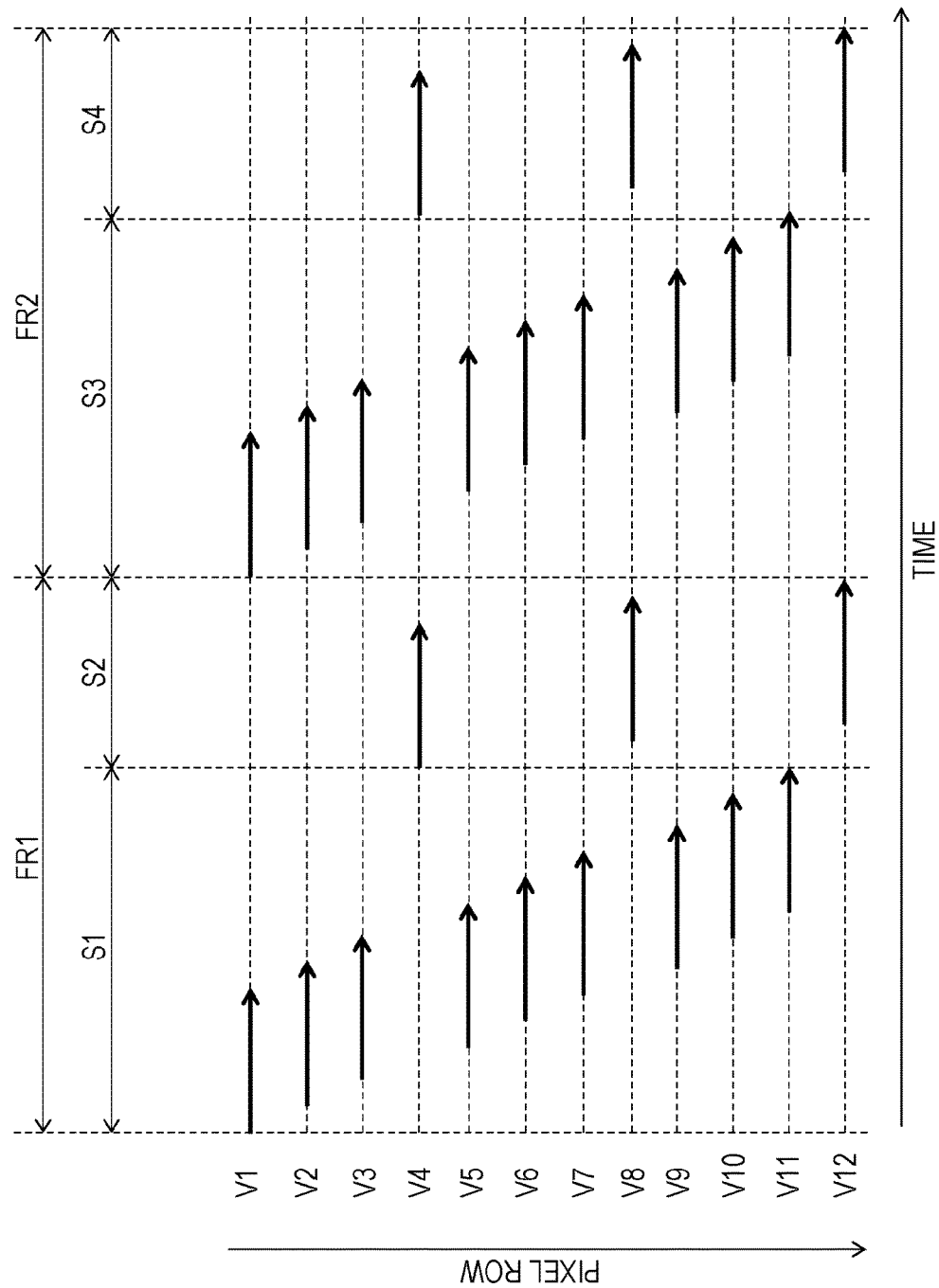
FIG. 4 is a readout sequence diagram.

FIG. 4 illustrates a signal readout sequence in the pixel portion. In FIG. 4, a vertical direction represents pixel rows, and a horizontal direction represents time. The pixel rows are arranged in the order of these numbers in plain view. The charge accumulation periods are controlled by an electronic shuttering operation. Specifically, the charge accumulation period is started by resetting the photoelectric conversion unit 103 in each pixel row, and after a predetermined period of time has elapsed, the charge accumulation period is ended by transferring the electric charges of the photoelectric conversion unit 103 in each pixel row.

With regard to the imaging plane as a whole, the charge accumulation periods of the plurality of image pickup pixel rows are started by sequentially resetting the charges accumulated in the photoelectric conversion units of the pixels in the respective image pickup pixel rows for each row. Subsequently, the charge accumulation periods of the plurality of image pickup pixel rows are ended by sequentially transferring the charges accumulated in the photoelectric conversion units of the pixels in the respective image pickup pixel rows to the FD 108 for each row. The charge accumulation periods of the mutually adjacent pixel rows among the image pickup pixel rows are overlapped with each other.

The charge accumulation periods of the plurality of function pixel rows are started by sequentially resetting the charges accumulated in the photoelectric conversion units of the respective pixels in the function pixel rows for each row. Subsequently, the charge accumulation periods of the plurality of function pixel rows are ended by sequentially transferring the charges accumulated in the photoelectric conversion units to the FD 108 for each row. The charge accumulation period of the function pixel row is not overlapped with the charge accumulation period of the image pickup pixel row. The charge accumulation periods of the mutual function pixel rows are overlapped with each other.

With the above-described operation, the signal during one charge accumulation period of the plurality of image pickup pixel rows and the signal during one charge accumulation period of the plurality of function pixel rows are output in a time division manner.

A period after the end of the charge accumulation period until the output of the signal to the signal line 115 is ended is referred to as an output period. A period represented by a starting point and an ending point of an arrow in FIG. 4 indicates the charge accumulation period and the output period in each row. The same also applies to FIG. 7, FIG. 9, FIG. 10, and FIG. 12.

A period from the start of the charge accumulation periods of all the pixel rows in the pixel portion 100 until the end of the output periods is set as one frame period, and the respective frame periods are set as a first frame period FR1 and a second frame period FR2. A third frame period FR3 and subsequent frame periods are omitted.

The first frame period FR1 is constituted by a first period S1 and a second period S2. In the first period S1, the function pixel rows V4, V8, and V12 are subjected to interlace scanning, and the image pickup pixel rows V1 to V3, V5 to V7, and V9 to V11 are sequentially scanned to output the signals. Since the function pixel rows V4, V8, and V12 are not scanned, the charge accumulation periods of these pixel rows are not started in the first period S1. In contrast, since the image pickup pixel rows V1 to V3, V5 to V7, and V9 to V11 are scanned, the charge accumulation periods of these pixel rows are sequentially started, and thereafter, the signals generated in the individual charge accumulation periods are sequentially output.

In the second period S2, the image pickup pixel rows V1 to V3, V5 to V7, and V9 to V11 are subjected to interlace scanning, and the function pixel rows V4, V8, and V12 are sequentially scanned to output the signals. Since the image pickup pixel rows V1 to V3, V5 to V7, and V9 to V11 are not scanned, the charge accumulation periods of these pixel rows are not started. In contrast, since the function pixel rows V4, V8, and V12 are scanned, the charge accumulation periods of these pixel rows are sequentially started, and thereafter, the signals generated in the individual charge accumulation periods are sequentially output.

Therefore, the charge accumulation periods of the function pixel rows V4, V8, and V12 are not overlapped with the charge accumulation periods of the respectively adjacently arranged pixel rows V3, V5, V7, V9, and V11.

Next, with reference to FIG. 5, descriptions will be given of detailed operations of the pixel rows V3 and V4 where the pixel in the image pickup pixel row and the pixel in the function pixel row commonly use the FD 108a and the pixel rows V5 and V6 where the mutual pixels in the plurality of image pickup pixel rows commonly use the FD 108b.

Figure 5:
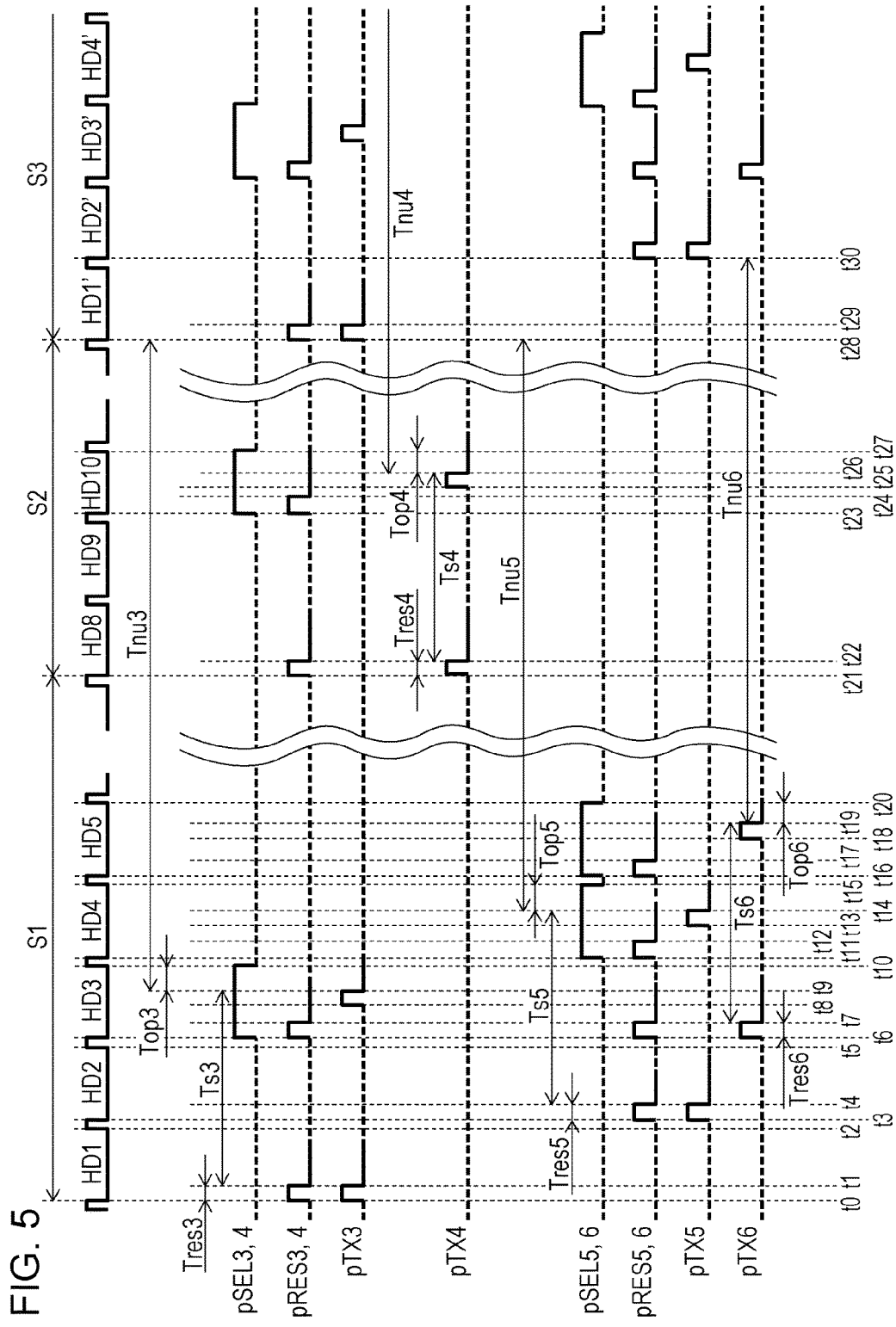
FIG. 5 is a drive timing chart.

The vertical direction of FIG. 5 represents driving pulses in the respective pixel rows, and the horizontal direction represents an elapse of time. A horizontal scanning period HD is set by a horizontal synchronous pulse.

In FIG. 5, the respective transistors are turned ON during a period in which the driving pulses are at a high level. With regard to the driving pulses of the respective transistors, the respective signals (pRES, pTX, pSEL) are supplied to the respective transistors in the corresponding pixel row from the vertical scanning circuit 120 during a period represented by a solid line. The respective signals are not supplied from the vertical scanning circuit 120 during a period represented by a broken line, which means that potentials of respective driving lines are held by parasitic capacitances. It should be noted however that the signal may also be supplied from the vertical scanning circuit 120 during the period represented by the broken line.

First, at a time t0, a first horizontal scanning period HD1 is started by the horizontal synchronous pulse. At this time, the driving pulses pRES3 and pRES4 and the driving pulse pTX3 in the pixel row V3 turn to the high level. Next, at a time t1, the driving pulses pRES3 and pRES4 and the driving pulse pTX3 turn to a low level. As a result, the photoelectric conversion unit 103 is reset, and a charge accumulation period Ts3 of the pixel in the pixel row V3 is started. A period t0 to t1 is set as a reset period Tres3. Although not illustrated in the drawing herein, signals are read out from pixels in a predetermined pixel row during the first horizontal scanning period HD1.

At a time t2, the first horizontal scanning period HD1 is ended.

Then, at a time t3, a second horizontal scanning period HD2 is started. At this time, the driving pulses pRES5 and pRES6 and the driving pulse pTX5 in the pixel row V5 turn to the high level.

Next, at a time t4, the driving pulses pRES5 and pRES6 and the driving pulse pTX5 turn to the low level. As a result, the photoelectric conversion unit 103a in the pixel row V5 is reset, and a charge accumulation period Ts5 of the pixel in the pixel row V5 is started. A period t3 to t4 is set as a reset period Tres5.

At a time t5, the second horizontal scanning period HD2 is ended.

At a time t6, a third horizontal scanning period HD3 is started, and the driving pulses pSEL3 and pSEL4 and the driving pulses pRES3 and pRES4 in the pixel row V3 turn to the high level. Furthermore, the driving pulses pRES5 and pRES6 and the driving pulse pTX6 in the pixel row V6 turn to the high level. Subsequently, at a time t7, the driving pulses pRES3 and pRES4 turn to the low level. As a result, the FD 108a in the pixel rows V3 and V4 is reset. In addition, the driving pulses pRES5 and pRES6 and the driving pulse pTX6 in the pixel row V6 turn to the low level. As a result, the photoelectric conversion unit 103b in the pixel row V6 is reset, and a charge accumulation period Ts6 is started. A period t6 to t7 is set as a reset period Tres6.

Then, during a period t7 to t8, the noise signal of the pixel row V3 is output to the signal line 115.

At a time t8, the driving pulse pTX3 turns to the high level, and at a time t9, the driving pulse pTX3 turns to the low level. With this operation, the charges accumulated in the photoelectric conversion unit 103a in the pixel row V3 are transferred to the first FD. A period t1 to t9 is set as the charge accumulation period Ts3 of the pixel row V3.

At a time t10, the driving pulses pSEL3 and pSEL4 turn to the low level. As a result, the selection transistor 107 in the pixel rows V3 and V4 is turned OFF. Subsequently, during a period t9 to t10, the signal based on the charges generated during the charge accumulation period Ts3 in the photoelectric conversion unit is output to the signal line 115. At the time t10, the third horizontal scanning period HD3 is ended. The period t9 to t10 is set as an output period Top3.

At a time t11, a fourth horizontal scanning period HD4 is started. At this time, the driving pulses pSEL5 and pSEL6 and the driving pulses pRES5 and pRES6 in the pixel row V5 turn to the high level, and the selection transistor 107 in the pixel rows V5 and V6 is turned ON. Resetting of the second FD commonly used by the pixels in the pixel rows V5 and V6 is started.

At a time t12, the driving pulses pRES5 and pRES6 turn to the low level, and as a result, resetting of the second FD commonly used by the pixels in the pixel rows V5 and V6 is completed. Then, during a period t12 to t13, the noise signal of the pixel row V5 is output to the signal line 115.

At a time t13, the driving pulse pTX5 turns to the high level, and at a time t14, the driving pulse pTX5 turns to the low level. With this operation, the charges accumulated in the photoelectric conversion unit 103a in the pixel row V5 are transferred to the second FD commonly used by the pixels in the pixel rows V5 and V6. A period t4 to t14 is set as the charge accumulation period Ts5 of the pixel row V5.

At a time t15, the driving pulses pSEL5 and pSEL6 turn to the low level. As a result, the selection transistor 107 in the pixel rows V5 and V6 is turned OFF. In addition, the fourth horizontal scanning period HD4 is ended. Subsequently, during a period t14 to t15, the signal based on the charges generated during the charge accumulation period Ts5 in the photoelectric conversion unit 103a in the pixel row V5 is output to the signal line 115. The period t14 to t15 is set as an output period Top5.

Subsequently, at a time t16, a fifth horizontal scanning period HD5 is started. At this time, the driving pulses pSEL5 and pSEL6 and the driving pulses pRES5 and pRES6 in the pixel row V6 turn to the high level. As a result, the selection transistor 107 in the pixel rows V5 and V6 is turned ON, and resetting of the second FD commonly used by the pixels in the pixel rows V5 and V6 is started.

At a time t17, the driving pulses pRES5 and pRES6 turn to the low level, and as a result, resetting of the second FD in the pixel rows V5 and V6 is completed. During a period t17 to t18, the noise signal of the pixel row V5 is output to the signal line 115.

At a time t18, the driving pulse pTX6 turns to the high level, and at a time t19, the driving pulse pTX6 turns to the low level. With this operation, the charges accumulated in the photoelectric conversion unit 103b in the pixel row V6 are transferred to the second FD used by the pixels in the pixel rows V5 and V6. A period t7 to t19 is set as the charge accumulation period Ts6 of the pixel row V6.

Subsequently, at a time t20, the driving pulses pSEL5 and pSEL6 turn to the low level, and the fifth horizontal scanning period HD5 is ended. During a period t19 to t20, the signal based on the charges generated during the charge accumulation period Ts6 in the photoelectric conversion unit 103b in the pixel row V6 is output to the signal line 115. The period t19 to t20 is set as an output period Top6. Thereafter, similarly, the signal generated during the charge accumulation period for the signal of the image pickup pixel row is read out. At a time point when the readout of all the signals for the image pickup pixels is completed, the first period S1 is ended.

It should be noted that, with regard to the function pixel row V4, the driving pulse pTX4 is at the low level until the entire readout operation for the image pickup pixel row during the first period S1 is ended. Subsequently, when the entire readout operation for the image pickup pixel row during the first period S1 is ended, the process shifts to the readout operation for the function pixel row during the second period S2. At this time, the readout operation for the function pixel row V4 is performed from an eighth horizontal scanning period HD8.

At a time t21, the eighth horizontal scanning period HD8 is started by the horizontal synchronous pulse. At this time, the driving pulses pRES3 and pRES4 and the driving pulse pTX4 in the pixel row V3 turn to the high level. Next, at a time t22, the driving pulses pRES3 and pRES4 and the driving pulse pTX4 turn to the low level. As a result, the photoelectric conversion unit 103 is reset, and a charge accumulation period Ts4 of the pixel in the pixel row V4 is started. A period t21 to t22 is set as a reset period Tres4.

After a ninth horizontal scanning period HD9 is ended, at a time t23, a tenth horizontal scanning period HD10 is started. The signal reading is performed from a pixel row that is not illustrated in the drawing during the ninth horizontal scanning period HD9. In addition, at the time t23, the driving pulses pSEL3 and pSEL4 and the driving pulses pRES3 and pRES4 in the pixel row V4 turn to the high level.

Subsequently, at a time t24, the driving pulses pRES3 and pRES4 turn to the low level. As a result, the FD 108a in the pixel rows V3 and V4 is reset. During a period t24 to t25, the noise signal of the pixel row V4 is output to the signal line 115.

At a time t25, the driving pulse pTX4 turns to the high level, and at a time t26, the driving pulse pTX4 turns to the low level. With this operation, the charges accumulated in the photoelectric conversion unit 103 in the pixel row V4 are transferred to the first FD. A period t22 to t26 is set as the charge accumulation period Ts4 of the pixel row V4.

At a time t27, the driving pulses pSEL3 and pSEL4 turn to the low level. As a result, the selection transistor 107 in the pixel rows V3 and V4 is turned OFF. Subsequently, during a period t26 to t27, the signal based on the charges generated during the charge accumulation period Ts4 in the photoelectric conversion unit 103 is output to the signal line 115. At the time t27, the tenth horizontal scanning period HD10 is ended. The period t26 to t27 is set as an output period Top4.

Herein, with respect to the pixel row V3, a state is established in which the charges are accumulated in the photoelectric conversion unit 103a during a period from the time t9 to a time t28 at which the charge accumulation period of the second frame period FR2 is started. Since the charges accumulated during the period t9 to t28 are not output as the signals to the outside of the pixel, this period is referred to as a null period Tnu3. Null periods Tnu4 and Tnu5 similarly exist in the pixel rows V4 and V5.

Herein, since the pixel in the pixel row V3 and the pixel in the pixel row V4 commonly use the first FD, leakage of the charges may occur from the photoelectric conversion unit 103b in the pixel row V4 to the commonly used first FD. As an alternative to the above-described configuration, leakage of the charges may occur from the photoelectric conversion unit 103a in the pixel row V3 to the commonly use first FD. If the charges are leaked to the first FD, the leakage causes noise when the signals of the respective photoelectric conversion units are transferred to the first FD.

This phenomenon often occurs in a case where an image of a high luminance object is picked up or a case where, with respect to the charge accumulation period Ts of one of the plurality of pixels that commonly use the first FD, the null period Tnu of the other pixel is long, in particular. As an alternative to the above-described configuration, the phenomenon often occurs when the amount of received light is excessive with respect to the charge amount at which the charges can be accumulated in the photoelectric conversion units 103a and 103b.

In view of the above, according to the present exemplary embodiment, in the configuration in which the pixel in the pixel row V3 and the pixel in the pixel row V4 commonly use the first FD, the signal processing unit 180 does not use the signal of the pixel in the pixel row V3 for the signal processing but performs the signal processing by using the signal of the other pixel row. Similarly, the signals of the pixels in the pixel rows V7 and V11 are not used for the signal processing.

Since the pixel rows V3, V7, and V11 correspond to the image pickup pixel rows according to the present exemplary embodiment, the signal processing unit 180 performs image forming processing by using the image pickup pixel rows other than the pixel rows V3, V7, and V11, that is, the pixel rows V1, V2, V5, V6, V9, and V10. In other words, the signal output from the pixel row where only the pixels in the plurality of image pickup pixel rows commonly use the second FD is used for the image forming processing in the signal processing unit 180.

For this reason, it is possible to form the image without using the signal read out from the pixel in the image pickup pixel row among the configuration in which the pixel in the image pickup pixel row and the pixel in the function pixel row commonly use the first FD for the image forming processing. As a result, it is possible to suppress the influence on the image caused by the leakage of the charges to the first FD.

Herein, it is possible to employ various methods as the method without using the signals of the pixel rows V3, V7, and V11 for the signal processing. For example, the signal that is not used for the signal processing such as the signal of the pixel row V3 is not input to the signal processing unit 180. As an alternative to the above-described configuration, after the signal is input to the signal processing unit 180, an address of the pixel is identified, and processing of ignoring the signal at the time of the signal processing may be performed.

As an alternative to the above-described configuration, the signals of the other ones of the pixel rows that commonly use the first FD, that is, the signals of the pixel rows V4, V8, and V12 may not be used in the signal processing unit 180. It should be noted herein that the function pixel rows that do not commonly use the FD with the image pickup pixel rows may be needed in this case in addition to the pixel rows V4, V8, and V12.

According to the present exemplary embodiment, it is possible to obtain the image pickup signals and the function signals in which the influence of the noise caused by the leakage of the charges via the FD is suppressed when the FD is commonly used.

In a case where the signals are not used for the image forming processing, signals of the image corresponding to the relevant part are absent. However, in a case where the signals may be absent depending on a resolution of the image, the image may be formed as it is. As an alternative to the above-described configuration, the image may be formed by performing interpolation by using signals in the surrounding pixel rows.

In addition, according to the present exemplary embodiment, the example in which the focus detection pixel is used as the function pixel has been described, but the configuration is not limited to this. For example, a pixel having a function other than the image pickup or a pixel that can output a signal used for the image pickup can be used as the function pixel. As a specific example, a distance detection pixel, a temperature detection pixel, and an infrared ray detection pixel can be used in addition to the above-described focus detection pixel. The same also applies to the following exemplary embodiments.

It should be noted that a rolling shutter operation in which the charge accumulation period varies for each pixel row is set up as an electronic shutter operation according to the present exemplary embodiment, but a global electronic shutter operation may also be set up. In the case of the global electronic shutter operation, all the charge accumulation periods of the plurality of first pixel rows or all the charge accumulation periods of the plurality of second pixel rows are overlapped with each other. The same also applies to the following exemplary embodiments.

Second Exemplary Embodiment

A difference between the present exemplary embodiment and the first exemplary embodiment resides in combination of the pixel rows that commonly use the FD 108 in the pixel portion 100. According to the present exemplary embodiment, a combination in which the pixels in the plurality of second pixel rows commonly use the third FD is further provided in addition to the combinations according to the first exemplary embodiment.

Figure 6:
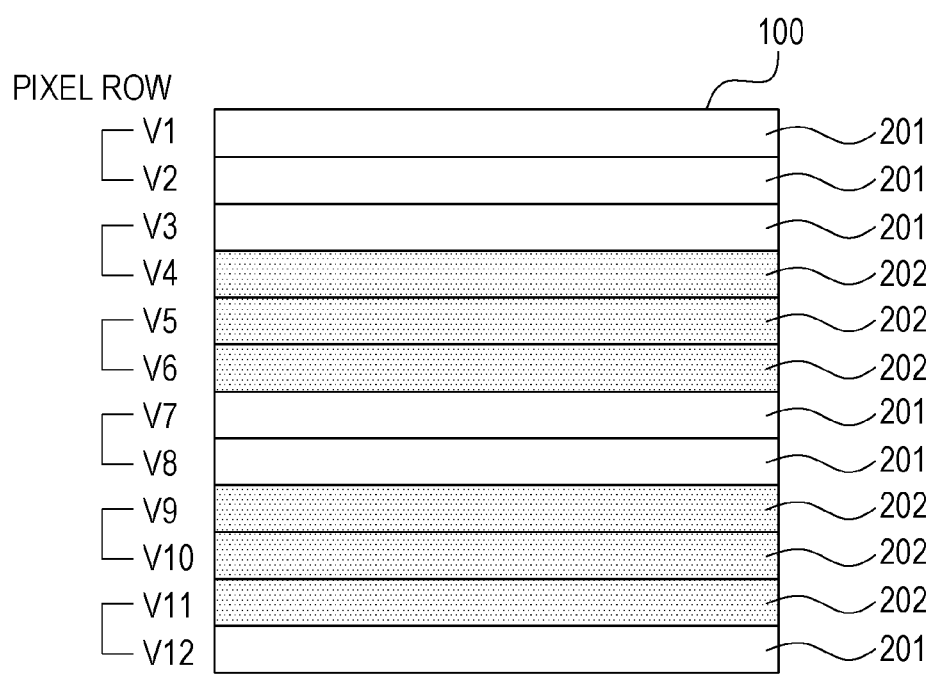
FIG. 6 is an explanatory diagram for illustrating the pixel portion.

FIG. 6 illustrates an arrangement of the respective pixel rows in the pixel portion 100 according to the present exemplary embodiment. The numbers of the function pixel rows 202 and the image pickup pixel rows 201 differ in FIG. 6 and FIG. 3. Herein, the pixel rows V1 to V3, V7, V8, and V12 correspond to the image pickup pixel rows, and the other pixel rows pixel rows the function pixel rows.

The pixel portion 100 according to the present exemplary embodiment includes the image pickup pixel row and the function pixel row which commonly use the first FD. The plurality of image pickup pixel rows that commonly use the second FD, and the plurality of function pixel rows that commonly use the third FD.

Figure 7:
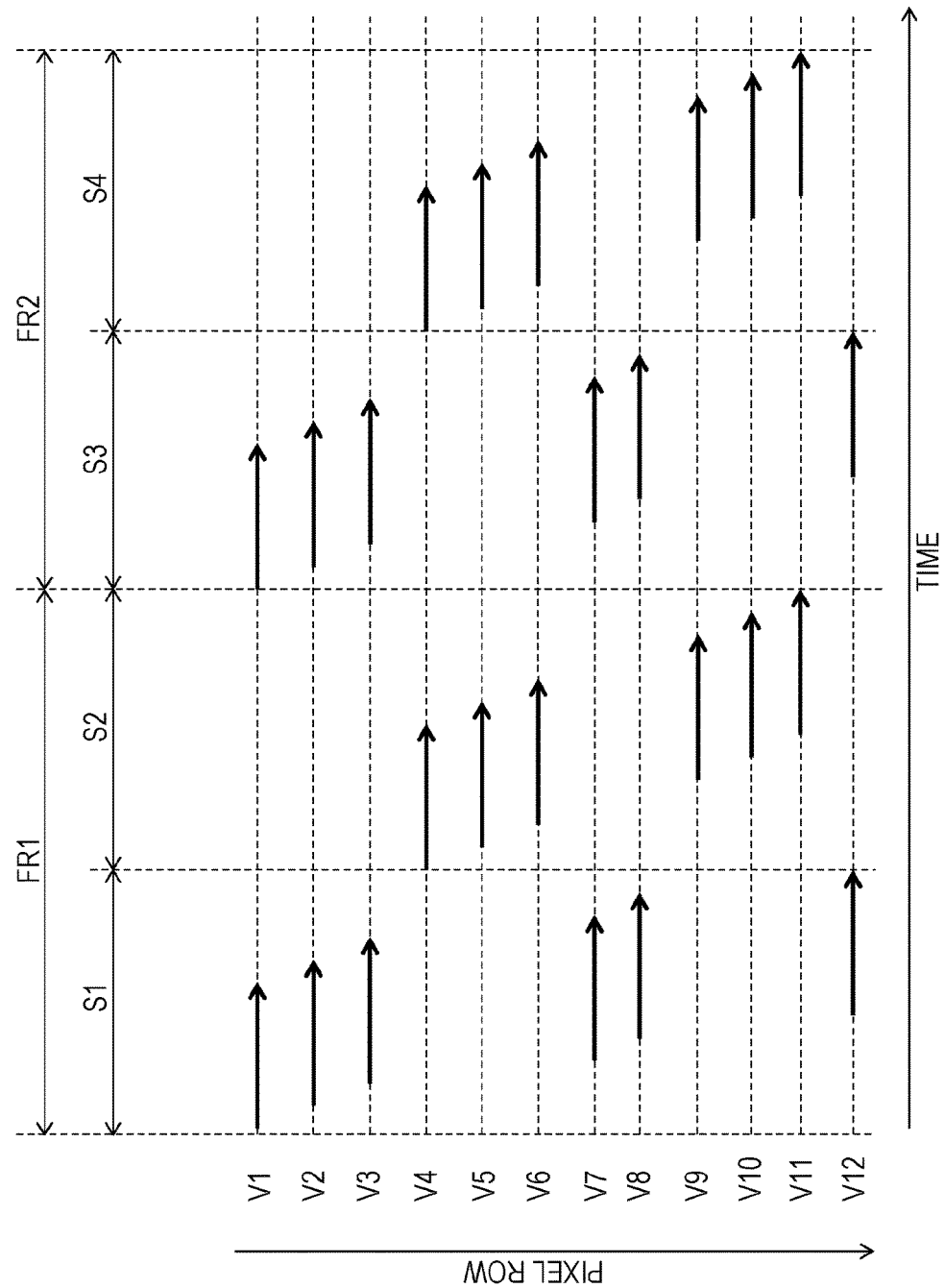
FIG. 7 is a readout sequence diagram.

FIG. 7 is a signal readout sequence of the pixel portion 100. In FIG. 7, during the first period S1, the pixel rows V4 to V6 and V9 to V11 corresponding to the function pixel rows are subjected to the interlace scanning, and the pixel rows V1 to V3, V7, V8, and V12 corresponding to the image pickup pixel rows are scanned such that the mutual charge accumulation periods are at least partially overlapped with each other. During the next second period S2, the respective pixel rows of the image pickup pixel rows are subjected to the interlace scanning, and the respective pixel rows of the function pixel rows V4 to V6 and V9 to V11 are sequentially scanned.

Next, with reference to FIG. 8, descriptions will be given of the part where the pixel in the image pickup pixel row and the pixel in the function pixel row commonly use the first FD and the part where the mutual pixels in the plurality of function pixel rows the part where the third FD are extracted among the signal readout sequence of the pixel rows illustrated in FIG. 7. It should be noted that, although not illustrated in FIG. 8, the configuration in which the mutual pixels in the plurality of image pickup pixel rows commonly use the second FD as described above is also provided according to the present exemplary embodiment.

Figure 8:
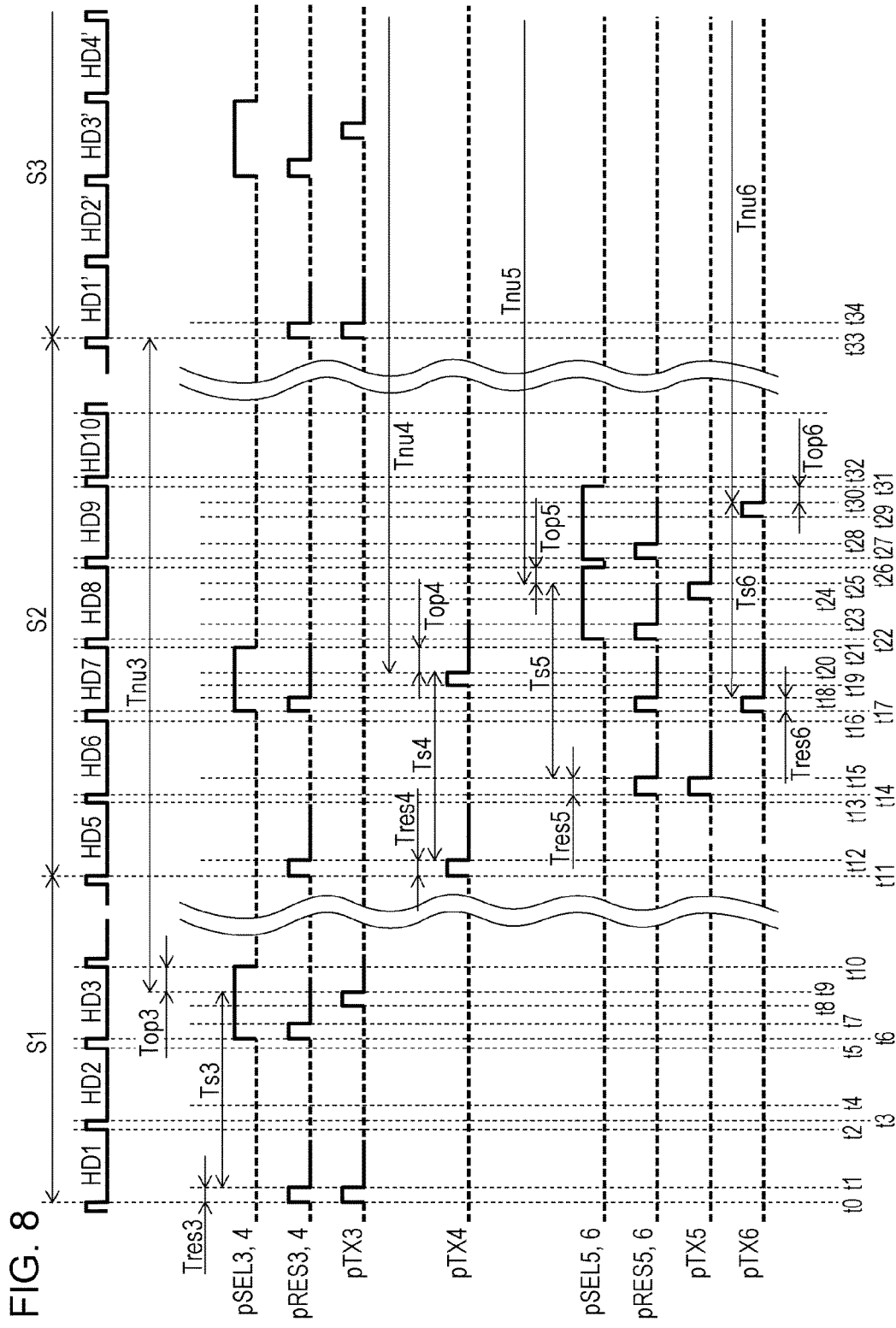
FIG. 8 is a drive timing chart.

With reference to FIG. 8, respective signal timings of the image pickup pixel row V3 and the function pixel rows V4, V5, and V6 among the 12 pixel rows illustrated in FIG. 7 will be described. A difference from FIG. 5 resides in that the readout operation is performed in the pixel rows V5 and V6 which commonly use the third FD on the pixels in the plurality of function pixel rows during the second period S2. Hereinafter, the difference from FIG. 5 will be mainly described.

During a period t0 to t10, the same scanning as in FIG. 5 is performed in the pixel row V3. Subsequently, after the plurality of image pickup pixel rows are scanned during the first period S1, the plurality of function pixel rows are scanned during the second period S2. Herein, the readout operation during the second period S2 will be described.

At the time t11, the fifth horizontal scanning period HD5 is started by the horizontal synchronous pulse. At this time, the driving pulses pRES3 and pRES4 and the driving pulse pTX4 in the pixel row V4 turn to the high level.

At the time t12, the driving pulses pRES3 and pRES4 and the driving pulse pTX4 turn to the low level. As a result, the photoelectric conversion unit 103b in the pixel row V4 is reset, and the charge accumulation period Ts4 in the photoelectric conversion unit 103b in the pixel row V4 is started. This period t11 to t12 is set as the reset period Tres4 in which the reset operation of the photoelectric conversion unit 103b is performed.

Although not illustrated in the drawing herein, signals are read out from pixels in a predetermined pixel row during the fifth horizontal scanning period HD5.

At the time t13, the fifth horizontal scanning period HD5 is ended. Subsequently, at the time t14, a sixth horizontal scanning period HD6 is started. At this time, the driving pulses pRES5 and pRES6 and the driving pulse pTX5 in the pixel row V5 turn to the high level.

Next, at the time t15, the driving pulses pRES5 and pRES6 and the driving pulse pTX5 turn to the low level. As a result, the photoelectric conversion unit 103a in the pixel row V5 is reset. The period t14 to t15 is set as the reset period Tres5. Then, the charge accumulation period Ts5 in the photoelectric conversion unit 103a in the pixel row V5 is started.

At the time t16, the sixth horizontal scanning period HD6 is ended. Then, at the time t17, a seventh horizontal scanning period HD7 is started. Then, the driving pulses pSEL3 and pSEL4 and the driving pulses pRES3 and pRES4 in the pixel row V4 turn to the high level. Since the driving pulses pSEL3 and pSEL4 turn to the high level, the selection transistor 107 in the pixel rows V3 and V4 are turned ON. Furthermore, the driving pulses pRES5 and pRES6 and the driving pulse pTX6 in the pixel row V6 turn to the high level. Subsequently, at the time t18, the driving pulses pRES3 and pRES4 turn to the low level. As a result, the FD 108a in the pixel rows V3 and V4 is reset. In addition, the driving pulses pRES5 and pRES6 in the pixel row V6 turn to the low level, and the photoelectric conversion unit 103b in the pixel row V6 is reset.

Subsequently, during a period t18 to t19, the noise signal of the pixel row V4 is output to the signal line 115. This period is set as the reset period Tres6 of the pixel row V6. Then, the charge accumulation period Ts6 in the photoelectric conversion unit 103b in the pixel row V6 is started.

At the time t19, the driving pulse pTX4 turns to the high level, and at the time t20, the driving pulse pTX4 turns to the low level. With this operation, the charges accumulated in the photoelectric conversion unit 103b in the pixel row V4 are transferred to the FD 108a in the pixel rows V3 and V4. A period t12 to t20 is set as the charge accumulation period Ts4 of the pixel row V4.

At the time t21, the driving pulses pSEL3 and pSEL4 turn to the low level. As a result, the selection transistor 107 in the pixel rows V3 and V4 is turned OFF. Then, the seventh horizontal scanning period HD7 is ended. Subsequently, during a period t20 to t21, the signal based on the charges generated during the charge accumulation period Ts4 in the photoelectric conversion unit 103b is output to the signal line 115. The period t20 to t21 is set as the output period Top4.

At the time t22, the eighth horizontal scanning period HD8 is started. At this time, the driving pulses pSEL5 and pSEL6 and the driving pulses pRES5 and pRES6 in the pixel row V5 turn to the high level. Then, the selection transistor 107 in the pixel rows V5 and V6 is turned ON.

At the time t23, the driving pulses pRES5 and pRES6 turn to the low level, and as a result, the FD 108 in the pixel rows V5 and V6 is reset. During a period t23 to t24, the noise signal of the pixel row V5 is output to the signal line 115.

At the time t24, the driving pulse pTX5 turns to the high level, and at the time t25, the driving pulse pTX5 turns to the low level. With this operation, the charges accumulated in the photoelectric conversion unit 103a in the pixel row V5 are transferred to the FD 108c in the pixel rows V5 and V6. A period t15 to t25 is set as the charge accumulation period Ts5 of the pixel row V5.

At the time t26, the driving pulses pSEL5 and pSEL6 turn to the low level. As a result, the selection transistor 107 in the pixel rows V5 and V6 is turned OFF. Then, the eighth horizontal scanning period HD8 is ended. Subsequently, during a period t25 to t26, the signal based on the charges generated during the charge accumulation period Ts5 in the photoelectric conversion unit 103a in the pixel row V5 is output to the signal line 115. The period t25 to t26 is set as the output period Top5.

Subsequently, at the time t27, the ninth horizontal scanning period HD9 is started. At this time, the driving pulses pSEL5 and pSEL6 and the driving pulses pRES5 and pRES6 in the pixel row V6 turn to the high level. Then, the selection transistor 107 in the pixel rows V5 and V6 is turned ON.

At the time t28, the driving pulses pRES5 and pRES6 turn to the low level, and as a result, the FD 108c in the pixel rows V5 and V6 is reset. During a period t28 to t29, the noise signal of the pixel row V5 is output to the signal line 115.

At a time t29, the driving pulse pTX6 turns to the high level, and at a time t30, the driving pulse pTX6 turns to the low level. With this operation, the charges accumulated in the photoelectric conversion unit 103b in the pixel row V6 are transferred to the FD 108c in the pixel rows V5 and V6. A period t18 to t30 is set as the charge accumulation period Ts6 in the pixel row V6.

Then, at a time t311, the driving pulses pSEL5 and pSEL6 turn to the low level, and the ninth horizontal scanning period HD9 is ended. During a period T30 to t31, the signal based on the charges generated during the charge accumulation period Ts6 in the photoelectric conversion unit 103b in the pixel row V6 is output to the signal line 115. The period T30 to t31 is set as the output period Top6.

In the scanning described with reference to FIG. 8 too, a situation similar to that of the first exemplary embodiment occurs. In contrast, according to the present exemplary embodiment, only the pixels in the plurality of function pixel rows commonly use the third FD, and the signals of these pixel rows are used for the signal processing in the signal processing unit 180.

For this reason, the signal of one of the pixel in the image pickup pixel row and the pixel in the function pixel row which commonly use the first FD may not be used. In one embodiment, the signals of the pixels in both of the pixel rows may not be used. This is because the mutual pixels in the plurality of function pixel rows according to the present exemplary embodiment can perform the signal processing in the signal processing unit 180 by using the signals output from the configurations which commonly use the third FD.

Third Exemplary Embodiment

A difference between the present exemplary embodiment and the first and second exemplary embodiments resides in that the signal from the pixel in the pixel row where the above-described leakage to the FD occurs is not output from the image pickup apparatus 10.

According to the first and second exemplary embodiments, the signal of the pixel where the noise may be generated by the leakage of the charges to the FD is also output from the image pickup apparatus 10 to the outside of the image pickup apparatus 10. For this reason, when the processing load in the signal processing unit 180 is high, and it is difficult to increase the speed of the signal readout. In contrast, according to the present exemplary embodiment, the above-described situations are addressed while the signal is not output from the image pickup apparatus 10.

The configuration of the present exemplary embodiment can be realized while the relevant pixel rows are subjected to the interlace scanning and the signals are not read out to the signal line 115 when the scanning is performed by the vertical scanning circuit 120. Furthermore, a configuration may be adopted in which, after the signals are read out to the signal line 115, the interlace scanning is performed in the horizontal scanning circuit, and the signals are not read out.

Figure 9:
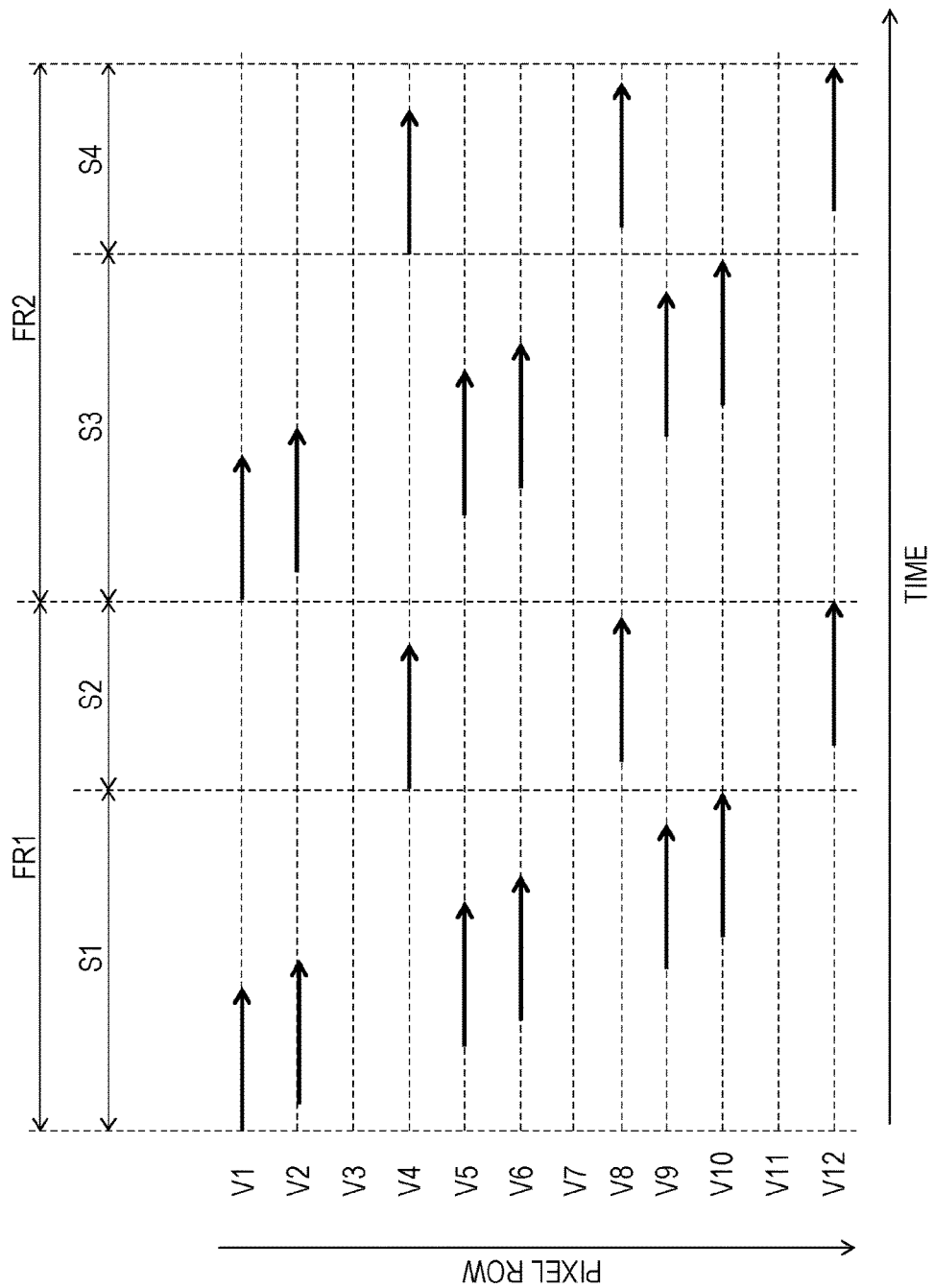
FIG. 9 is a readout sequence diagram.

First, according to the present exemplary embodiment, a case will be described where the pixel portion 100 has the same as the configuration illustrated in FIG. 3 according to the first exemplary embodiment. FIG. 9 illustrates the signal readout sequence at this time. According to the present exemplary embodiment, the signal output in the image pickup pixel row is not performed among the pixel in the image pickup pixel row and the pixel in the function pixel row which commonly use the first FD. Herein, the descriptions will be given while the relevant image pickup pixel row is set as the pixel row V3.

In a case where the signal of the pixel row V3 is not read out by the vertical scanning circuit 120, the driving pulses pSEL3 and pSEL4 of FIG. 5 are set to the low level during at least the output period Top3. As a result, it is possible to turn off the selection transistor 107 during the period in which the signal output is performed. As an alternative to the above-described configuration, the driving pulse pTX3 during a period t7 to t10 may be set to the low level.

In a case where the signal of the pixel row V3 is not read out by the horizontal scanning circuit 150, a configuration may be adopted that the signal is not read out to the column circuit 140 while the signal of the pixel row V3 is subjected to the interlace scanning when the horizontal scanning is performed.

Figure 10:
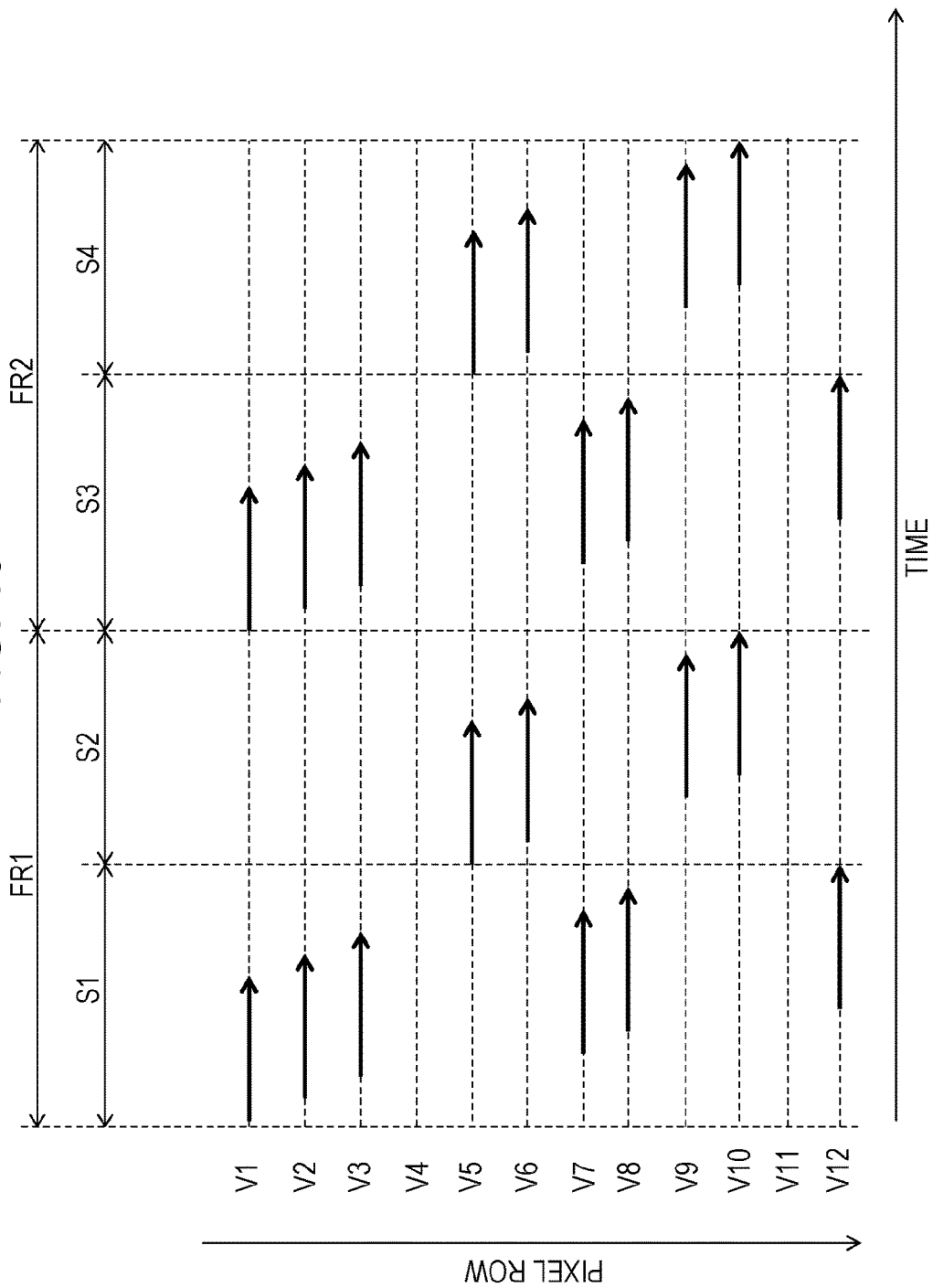
FIG. 10 is a readout sequence diagram.

Next, a case will be described where the pixel portion 100 has the same as the configuration illustrated in FIG. 6 according to the second exemplary embodiment. The signal readout sequence of the pixel portion at this time corresponds to FIG. 10. In FIG. 10, the readout of the function pixel row among the image pickup pixel row and the function pixel row which commonly use the first FD is not performed. Herein, descriptions will be given while the relevant function pixel row is set as the pixel row V4.

In a case where the signal of the pixel row V4 is not read out by the vertical scanning circuit 120, the driving pulses pSEL3 and pSEL4 of FIG. 8 are set to the low level during at least the output period Top4. As a result, it is possible to turn off the selection transistor 107 during the period in which the signal output is performed.

As an alternative to the above-described configuration, the driving pulse pTX4 is set to the low level during at least a period t18 to t21. As a result, the charges accumulated in the photoelectric conversion unit 103b in the pixel row V4 are not transferred to the FD 108a during a period in which the signal can be held in the FD 108a when the selection transistor 107 is on.

The signals output via the driving line 114 by the vertical scanning circuit 120 are processed in parallel in the column circuit 140. In a case where the signal of the pixel row V4 is not read out by the horizontal scanning circuit 150, the held signal is not read out to the column circuit 140 while the signal of the pixel row V4 is subjected to the interlace scanning when the horizontal scanning is performed.

According to the present exemplary embodiment, the processing load in the signal processing unit 180 can be reduced in addition to the advantages obtained according to the above-described exemplary embodiments, and it is possible to increase the speed of the signal readout and save the power consumption.

Fourth Exemplary Embodiment

A difference between the present exemplary embodiment and the above-described exemplary embodiments resides in combinations of pixel rows that commonly use the FD 108. According to the above-described exemplary embodiments, the first pixel row and the second pixel row commonly use the first FD, but according to the present exemplary embodiment, the mutual pixels in the first pixel row and the mutual pixels in the second pixel row commonly use the second FD and the third FD. A configuration in which the first pixel row and the second pixel row commonly use the second FD is not adopted.

With the above-described configuration, since the charge accumulation periods are overlapped with each other among the pixel rows that commonly use the FD, it is possible to reduce the leakage amount of charges to the FD.

Figure 11:
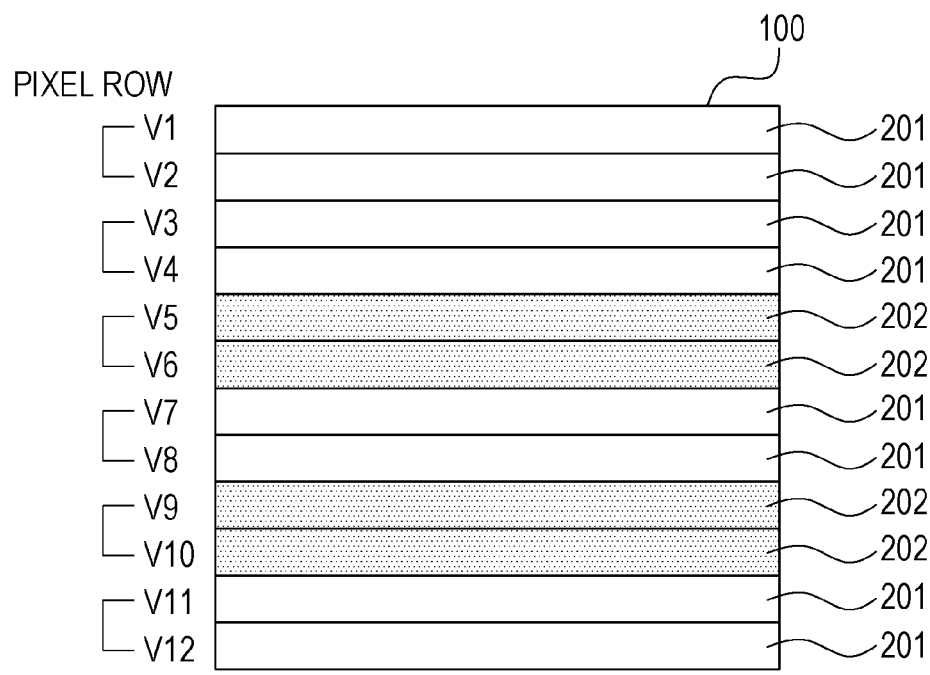
FIG. 11 is an explanatory diagram for illustrating the pixel portion.

With reference to FIG. 11, an arrangement of a plurality of pixel rows in the pixel portion 100 according to the present exemplary embodiment will be described. Similarly as in FIG. 3, 12 pixel rows are illustrated while the pixel rows are partially omitted. According to the present exemplary embodiment, the image pickup pixel rows correspond to the pixel row V1 to V4, V7, V8, V11, and V12, and the function pixel rows correspond to the pixel rows V5, V6, V9, and V10.

Subsequently, the pixel portion 100 according to the present exemplary embodiment is different from that of the first to third exemplary embodiments and does not have the configuration in which the pixel in the image pickup pixel row and the pixel in the function pixel row commonly use the FD. A configuration in which only the pixels in the plurality of image pickup pixel rows commonly use the second FD and a configuration in which only the pixels in the plurality of function pixel rows commonly use the third FD are provided.

FIG. 12 is a signal readout sequence diagram of the pixel portion. In FIG. 12, during the first period S1, the pixel rows V5, V6, V9, and V10 corresponding to the function pixel rows are subjected to the interlace scanning, and the pixel row V1 to V4, V7, V8, V11, and V12 are sequentially scanned. Next, during the second period S2, the respective pixel rows of the image pickup pixel rows are subjected to the interlace scanning, and the respective pixel rows of the function pixel rows are sequentially scanned.

In FIG. 13, respective signal timings of the pixel rows V3, V4, V5, and V6 among the 12 pixel rows illustrated in FIG. 12 will be described.

Herein, only the operation timings of the image pickup pixel rows will be described. Operations of the function pixel rows are the same as those in FIG. 8, and descriptions thereof will be omitted.

First, at the time t0, the first horizontal scanning period HD1 is started by the horizontal synchronous pulse. At this time, the driving pulses pRES3 and pRES4 and the driving pulse pTX3 in the pixel row V3 turn to the high level. Next, at the time t1, the driving pulses pRES3 and pRES4 and the driving pulse pTX3 turn to the low level. As a result, the photoelectric conversion unit 103a is reset, and the charge accumulation period Ts3 of the pixel in the pixel row V3 in the photoelectric conversion unit 103a is started. The period t0 to t1 is set as the reset period Tres3 in which the reset operation of the photoelectric conversion unit 103a is performed.

Although not illustrated in the drawing herein, signals are read out from pixels in a predetermined pixel row during the first horizontal scanning period HD1.

At the time t2, the first horizontal scanning period HD1 is ended. Then, at the time t3, the second horizontal scanning period HD2 is started. At this time, the driving pulses pRES3 and pRES4 and the driving pulse pTX4 in the pixel row V4 turn to the high level. Next, at the time t4, the driving pulses pRES3 and pRES4 and the driving pulse pTX4 turn to the low level. As a result, the photoelectric conversion unit 103b in the pixel row V4 is reset. The period t3 to t4 is set as the reset period Tres4. Then, the charge accumulation period Ts4 in the photoelectric conversion unit 103b in the pixel row V4 is started.

At the time t5, the second horizontal scanning period HD2 is ended. Then, at the time t6, the third horizontal scanning period HD3 is started. At the time t6, the driving pulses pSEL3 and pSEL4 and the driving pulses pRES3 and pRES4 in the pixel row V3 turn to the high level. Since the driving pulses pSEL3 and pSEL4 turn to the high level, the selection transistor 107 in the pixel rows V3 and V4 is turned ON.

Subsequently, at the time t7, the driving pulses pRES3 and pRES4 turn to the low level. As a result, the FD 108b in the pixel rows V3 and V4 is reset.

Subsequently, during the period t7 to t8, the noise signal of the pixel row V3 is output to the signal line 115.

At the time t8, the driving pulse pTX3 turns to the high level, and at the time t9, the driving pulse pTX3 turns to the low level. With this operation, the charges accumulated in the photoelectric conversion unit 103a in the pixel row V3 are transferred to the FD 108b in the pixel rows V3 and V4. The period t1 to t9 is set as the charge accumulation period Ts3 of the pixel row V3. From the time t9 to a time t32 corresponding to the start of the next reset period Tres3, the pixel row V3 is set as the null period Tnu3.

At the time t10, the driving pulses pSEL3 and pSEL4 turn to the low level. As a result, the selection transistor 107 in the pixel rows V3 and V4 is turned OFF. In addition, the third horizontal scanning period HD3 is ended. Subsequently, during the period t9 to t10, the signal based on the charges generated during the charge accumulation period Ts3 in the photoelectric conversion unit 103a is output to the signal line 115. The period t9 to t10 is set as the output period Top3.

At the time t11, the fourth horizontal scanning period HD4 is started. At this time, the driving pulses pSEL3 and pSEL4 and the driving pulses pRES3 and pRES4 in the pixel row V4 turn to the high level. Then, the selection transistor 107 in the pixel rows V3 and V4 is turned ON.

At the time t12, the driving pulses pRES3 and pRES4 turn to the low level, and as a result, the FD 108b in the pixel rows V3 and V4 is reset. During the period t12 to t13, the noise signal of the pixel row V4 is output to the signal line 115.

At the time t13, the driving pulse pTX4 turns to the high level, and at the time t14, the driving pulse pTX4 turns to the low level. With this operation, the charges accumulated in the photoelectric conversion unit 103b in the pixel row V4 are transferred to the FD 108b in the pixel rows V3 and V4. The period t4 to t14 is set as the charge accumulation period Ts4 of the pixel row V4. From the time t14 to the start of the next reset period Tres4, the pixel row V4 is set as a null period Tnu4.

At the time t15, the driving pulses pSEL3 and pSEL4 turn to the low level. As a result, the selection transistor 107 in the pixel rows V3 and V4 is turned OFF. In addition, the fourth horizontal scanning period HD4 is ended. Subsequently, during the period t14 to t15, the signal based on the charges generated during the charge accumulation period Ts4 in the photoelectric conversion unit 103a in the pixel row V4 is output to the signal line 115. The period t14 to t15 is set as the output period Top4.

According to the present exemplary embodiment, the configuration has been adopted in which the charge accumulation periods of the pixel rows that commonly use the FD are at least partially overlapped with each other. Therefore, even when the plurality of first pixel rows where the charge accumulation periods are at least partially overlapped with each other and the plurality of second pixel rows where the charge accumulation periods are not overlapped with the charge accumulation periods of the plurality of first pixel rows are provided, it is possible to reduce the influence of the noise via the commonly used FD.

The present invention has been described above by using the plurality of exemplary embodiments, but the present invention is not limited to the respective exemplary embodiments. Modifications and combinations can be appropriately made in a range without departing from the gist of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-043889, filed Mar. 5, 2015, which is hereby incorporated by reference herein in its entirety.

What is claimed is:

1. An image pickup system comprising:
an image pickup apparatus including: a pixel portion where pixels that each include a photoelectric conversion unit, a floating diffusion, and a transfer transistor configured to transfer charges generated in the photoelectric conversion unit to the floating diffusion are arranged in a matrix; and a scanning circuit configured to control charge accumulation periods of the respective pixels by an electronic shutter operation and output signals generated during the charge accumulation periods from the pixels; and
a signal processing unit configured to process a signal output from the image pickup apparatus,
the pixel portion including
a plurality of first rows which include pixels controlled by the scanning circuit such that the charge accumulation periods are at least partially overlapped with each other, and
a plurality of second rows which include pixels controlled by the scanning circuit such that the charge accumulation periods are not overlapped with the charge accumulation periods of the plurality of first rows wherein
a first pixel of the plurality of first rows uses the floating diffusion with a second pixel of the plurality of the second rows in common,
a third pixel of the plurality of first rows does not use the floating diffusion with any pixel of the plurality of the second rows in common, and
the signal processing unit performs signal processing without using a signal of the first pixel.

2. The image pickup system according to claim 1, wherein the pixel portion further includes
the plurality of first rows where the floating diffusion is commonly used by only pixels in the plurality of first rows among pixels in the plurality of first rows and pixels in the plurality of second rows, and
the signal processing unit performs the signal processing by using signals of the pixels in the plurality of first rows where the floating diffusion is commonly used by only the pixels in the plurality of first rows.

3. The image pickup system according to claim 1, wherein a fourth pixel of the plurality of second rows uses the floating diffusion with a fifth pixel of the plurality of the second rows in common, the signal processing unit performs signal processing to the fourth pixel.

4. The image pickup system according to claim 1, wherein the first pixel is an image pickup pixel, and the second pixel has a function other than image pickup.

5. The image pickup system according to claim 4, wherein the first pixel uses the floating diffusion with another image pickup pixel in common.

6. The image pickup system according to claim 4, wherein the second pixel uses the floating diffusion with another function pixel in common.

7. The image pickup apparatus according to claim 1, wherein the first pixel is an image pickup pixel, and the second pixel is a focus detection pixel.

8. An image pickup apparatus comprising:
a pixel portion where pixels that each include a photoelectric conversion unit, a floating diffusion, and a transfer transistor configured to transfer charges generated in the photoelectric conversion unit to the floating diffusion are arranged in a matrix; and
a scanning circuit configured to control charge accumulation periods of the respective pixels by an electronic shutter operation and output signals generated during the charge accumulation periods from the pixels,
the pixel portion including
a plurality of first rows which include pixels controlled by the scanning circuit such that the charge accumulation periods are at least partially overlapped with each other, and
a plurality of second rows which include pixels controlled by the scanning circuit such that the charge accumulation periods are not overlapped with the charge accumulation periods of the plurality of first rows, wherein
a first pixels of the plurality of first rows uses the floating diffusion with a second pixel of the plurality of second rows,
a third pixel of the plurality of first rows does not use the floating diffusion with any pixel of the plurality of second rows in common, and
the scanning circuit does not output a signal of the first pixel but outputs a signal of the third pixel.

9. The image pickup apparatus according to claim 8, wherein
the first pixel is an image pickup pixel, and the second pixel has a function other than image pickup.

10. The image pickup apparatus according to claim 8, wherein the first pixel is an image pickup pixel, and the second pixel is a focus detection pixel.

* * * * *